June 5, 1962  R. L. CARBREY  3,038,029
PULSE TRANSMISSION OF ALTERNATE INTERCHANGE CODE
Filed June 15, 1959  7 Sheets-Sheet 1

INVENTOR
R. L. CARBREY
BY Harry C. Nard
ATTORNEY

June 5, 1962   R. L. CARBREY   3,038,029
PULSE TRANSMISSION OF ALTERNATE INTERCHANGE CODE
Filed June 15 1959   7 Sheets-Sheet 2

NATURAL BINARY
CODING MASK (PRIOR ART)

REFLECTED BINARY
CODING MASK (PRIOR ART)

INVENTOR
*R. L. CARBREY*
BY
*Harry C. Hart*
ATTORNEY

June 5, 1962  R. L. CARBREY  3,038,029
PULSE TRANSMISSION OF ALTERNATE INTERCHANGE CODE
Filed June 15, 1959  7 Sheets-Sheet 3

INVENTOR
R. L. CARBREY
BY *Harry C. Hart*
ATTORNEY

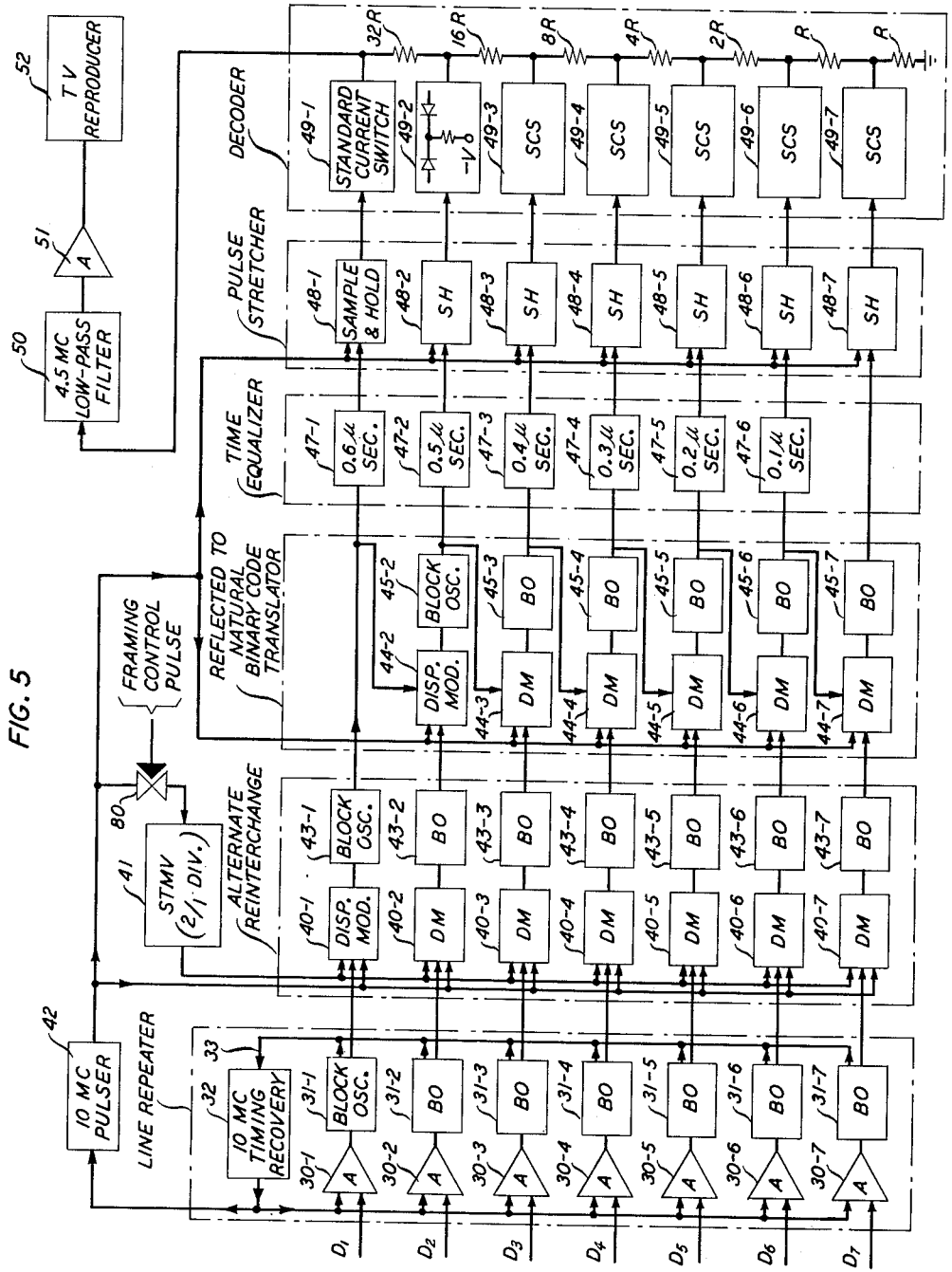

June 5, 1962    R. L. CARBREY    3,038,029
PULSE TRANSMISSION OF ALTERNATE INTERCHANGE CODE
Filed June 15, 1959    7 Sheets-Sheet 6

INVENTOR
R. L. CARBREY
BY
Harry C. Hart
ATTORNEY

June 5, 1962   R. L. CARBREY   3,038,029
PULSE TRANSMISSION OF ALTERNATE INTERCHANGE CODE
Filed June 15, 1959   7 Sheets-Sheet 7

INVENTOR
R.L. CARBREY
BY Harry C. Hart
ATTORNEY

3,038,029
PULSE TRANSMISSION OF ALTERNATE INTERCHANGE CODE
Robert L. Carbrey, Madison, N.J., assignor to Bell Telephone Laboratories, Incorporated, New York, N.Y., a corporation of New York
Filed June 15, 1959, Ser. No. 820,307
22 Claims. (Cl. 178—26)

This invention deals with the transmission of coded information and has for its principal object the construction of a two-valued permutation code that is especially suitable for transmission in pulse form.

The general class of two-valued permutation codes includes many members, all of which have in common the features that (a) they admit of only two recognizably different conditions, variously designated as dot and dash, mark and space, "+" and "—," and "0" or, more generally $a$ and $b$; and (b) a different meaning is assigned, in accordance with the code, to each different permutation of such elements.

Among the many members of the class of two-valued permutation codes are the Morse code, the two-out-of-five code, the natural binary code and the reflected binary code. Each of them offers certain advantages, from the standpoint of instrumentation, and certain disadvantages. Thus the Morse code based, as it is, on the statistics of the English language, offers economies in the transmission of an English message: but the fact that its code words are of different lengths poses formidable timing problems. The two-out-of-five code is readily constructed and translated, but is of very restrictive scope. The natural binary code, perhaps the principal member of the class, is so called from the fact that the weights assigned to its several code elements are proportional to the successive powers of 2. It is the most common member and, perhaps for that reason, is sometimes termed the "conventional" binary code although, because conventions change from time to time, the term "conventional" seems unfortunate. This "natural" binary code is also the oldest, since it dates at least from the publication, early in the seventeenth century, of Francis Bacon's "De Augmentis Scientiarum." It is open to the objection that any minor coding error can result in a major error in the decoded message. As pointed out by F. Gray in his Patent 2,632,058, granted March 17, 1953, the reflected binary code escapes from this particular difficulty.

In general, however, any unvarying or "fixed" code consists of unvarying sequences of code elements when the coded message is equally unvarying; and this in itself makes for difficulties in instrumentation. A clear instance of such difficulties arises in the binary coding, natural or reflected, of a television wave. Because of the very high information rates involved in such waves, it is advantageous to develop the several elements of each code word simultaneously and in parallel employing, for the purpose, a "Flash" coder of the type described by W. M. Goodall in his Patent 2,616,060, granted October 28, 1952. Because of the statistics of the television wave, the output conductors of the higher denominational orders usually deliver long, unbroken trains of marks (or spaces), each followed by a long, unbroken string of spaces (or marks). In the usual situation in which the transmission medium is opaque to direct current, this condition makes for a "wandering zero" that has plagued telegraphers for generations. It also represents loss of timing information. Both zero wander and timing information loss make for uncertainties in the operation, not only of the decoding apparatus, but of every intermediate regenerative repeater as well.

The present invention proposes a single solution for both of these problems together. This solution is to replace every alternate code element, from the value it bears as it emerges from the fixed plan coder, by the other one of its two permitted values. The pulse train that results from this operation is designated "Alternate Interchange Code." Thus every alternate mark (or space) is replaced by a space (or mark); every unbroken sequence of marks becomes an alternating mark-space sequence; and every unbroken sequence of spaces becomes an alternating space-mark sequence. The latter, it is to be noted, contains the same timing information and has the same average value as does the former, differing from it only in phase.

This alternate interchange of code element values is accomplished in the following way. A carrier wave pulse train is generated of which the constant frequency is precisely one half the basic pulse repetition rate of the coder output pulse train, and the code pulse train is parity-modulated with this carrier. By "parity modulation" or "disparity modulation" is meant the process of comparing each excursion of the carrier wave with the simultaneously existing code element; if their values are alike, a space (or a mark) is signaled, and if they are unlike, a mark (or a space) is signaled. Stated in another way, and designating the two possible element values, both for the code pulse train and for the carrier as "1" and "0," then the coaction between them for all four possible conditions is as given, for a disparity modulator, in Table I:

TABLE I

| Code element | Carrier element | Output |
|---|---|---|
| 1 | 1 | 0 |
| 0 | 1 | 1 |
| 1 | 0 | 1 |
| 0 | 0 | 0 | while the results of their interactions in a parity modulator are as given in Table II:

TABLE II

| Code element | Carrier element | Output |
|---|---|---|
| 1 | 1 | 1 |
| 0 | 1 | 0 |
| 1 | 0 | 0 |
| 0 | 0 | 1 |

Thus a single inverse relation holds between the operation of a parity modulator and that of a disparity modulator. In each case an output of one kind is developed for either of the two like-input conditions while an output of the opposite kind is developed for either of the two different-input conditions. In the first case the operation is that of binary addition, without carry, and the second is inverse to the first. Such a modulator is to be contrasted with the conventional product modulator which delivers an output of one kind in only one of the four possible cases and an output of the other kind in the remaining three cases. Thus

TABLE III

| Code element | Carrier element | Output |
|---|---|---|
| 1 | 1 | 1 |
| 0 | 1 | 0 |
| 1 | 0 | 0 |
| 0 | 0 | 0 |

Product modulation, the common and widely known variety, does not serve the purposes of the invention. The parity (or disparity) modulation required is a modulation technique that is relatively unknown. Nevertheless, it falls squarely within the common dictionary definition of the word "modulation."

The adoption of the alternate interchange code for transmission offers great freedom in the selection, in the first instance of the generated code to which the alternate interchange operation is applied and, in the second instance, of the recovered code that is ultimately translated by a decoding operation into the message. Thus, it is well established that the reflected binary code of F. Gray Patent 2,632,058 offers advantages in the coding operation though it presents difficulties in decoding. It is equally well established that the natural binary code, subject to disproportionate errors in encoding, is readily and reliably decoded with the aid of simple apparatus. Thus it is of advantage to translate the original message directly into the reflected binary code, to apply the disparity modulation step to this reflected code and transmit the resulting alternate interchange code to the receiver station, to remove the interchange, thus restoring the reflected code to its initial form, to translate the reflected code into natural binary code and, finally, to recover the original message from this natural binary code, employing any of a number of well known decoders to do so.

It happens that the translation from the reflected binary code to the natural binary code involves operations that include disparity modulation of each incoming code element, not with a carrier wave, but with another code element; in particular, the output of the disparity modulator. Code translation apparatus of this type is disclosed in R. L. Carbrey Patents 2,571,680, granted October 16, 1951, and 2,755,459, granted July 17, 1956.

Because of the similarity between the operations required for code translation and those required for removing the interchange feature, it turns out to be possible to carry them out simultaneously and together, utilizing for the purpose a single unit, termed an odd-binary pulser, having three independent input points.

All possible message waves of any specified class have certain features and characteristics in common. Thus, the average amplitude of any speech wave is zero and, of all possible amplitudes, zero amplitude occurs with the greatest frequency while extreme amplitudes, positive or negative, are rare. In a television wave the information required for synchronous operation is carried by pulses of preassigned amplitude and duration that occur with full regularity throughout the scanning cycle.

When a wave having any such feature, common to all waves of its class, is converted, for transmission, into a train of code pulse groups, each standing for a single wave amplitude, the feature is preserved in the pulse groups. But if, due to loss of synchronism or "framing" as between the receiver apparatus and the transmitter apparatus, the pulses of the train are misgrouped, the feature is lost.

The invention turns this situation to account in the following way. The train of incoming apparent pulse groups is monitored to determine whether or not the train of code words, represented by them and to which they correspond, contains this common feature. If they do, it is concluded that the receiver is properly framed. If they do not, it is concluded that synchronism has been lost, whereupon steps are automatically taken, by regrouping the pulses and so reframing the receiver, to regain it.

It is a feature of the code of the invention that, unlike the situation that obtains with other codes, the framing condition can be of only two kinds: correct and incorrect. This makes for ease of recognition of the incorrect framing condition and for simplicity of the apparatus for converting it to the correct condition. The invention encompasses methods and apparatus, of several different kinds, for carrying out both of these operations.

The invention will be fully apprehended from the following detailed description of illustrative embodiments thereof, taken in connection with the appended drawings, in which:

FIG. 5 is a block schematic diagram showing receiver apparatus embodying the invention;

Figure 1:
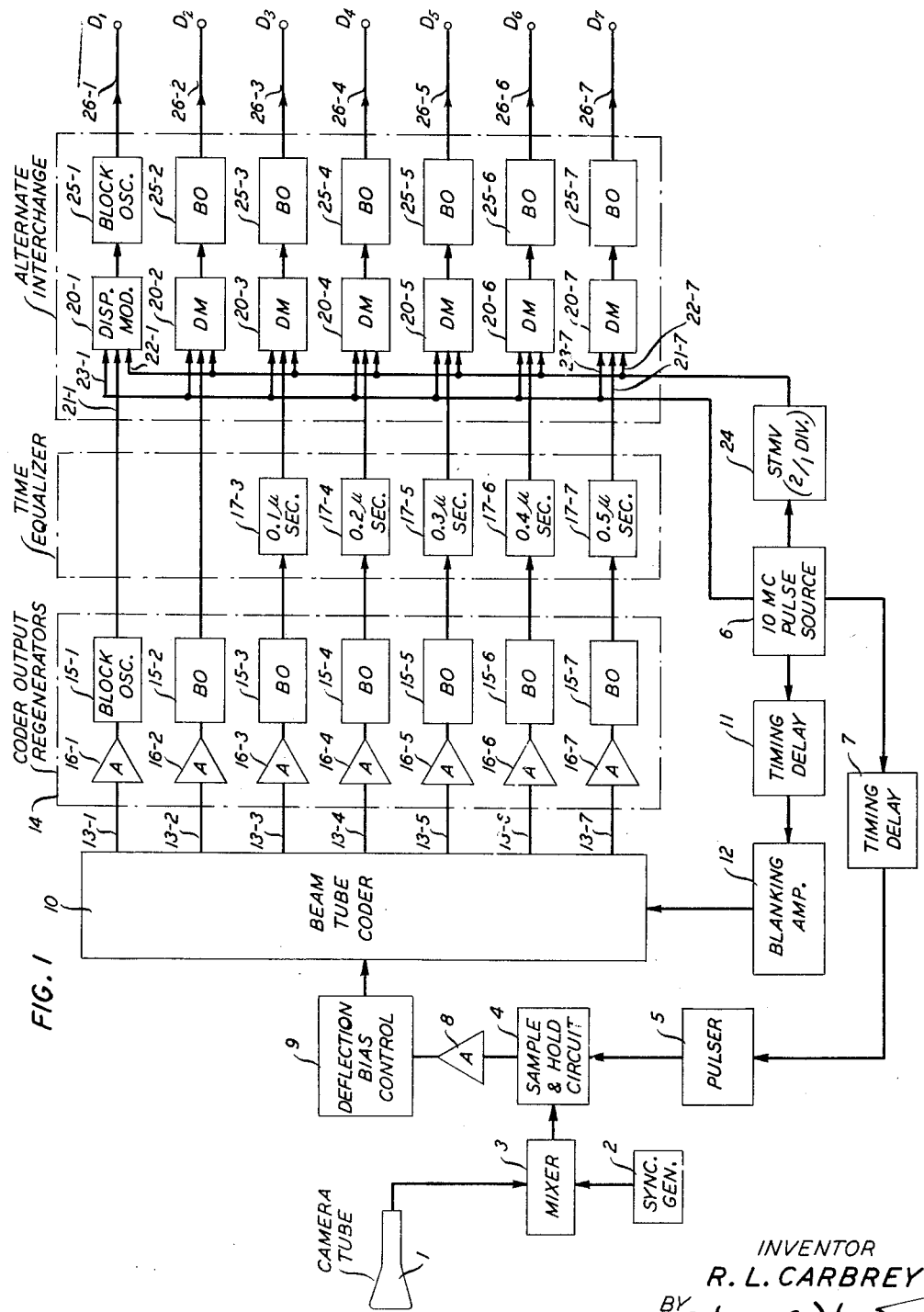
FIG. 1 is a schematic block diagram showing transmitter apparatus embodying the invention.

Referring now to the drawings, FIG. 1 shows apparatus for converting a message wave into the alternate interchange binary code of the invention through disparity modulation of a suitable pulse train. For the sake of illustration the message wave to which this process is applied is a standard television wave of which the vision signal portion may be derived from a camera tube 1 and the horizontal and vertical synchronizing portions from a sync generator 2. These two signal portions are mixed together with conventional apparatus 3 and applied, as a standard television signal, to a conventional holding sampler 4. The latter is operated ten times in each microsecond by a pulser 5 that is under control of a 10 megacycle timing wave source 6. The phasing of the control pulses is coordinated with the phasing of other events that take place elsewhere in the system by the inclusion of a delay equalizer 7.

The sequence of amplitude samples of the television signal thus derived is brought to a suitable energy level by an amplifier 8 and a steady bias is added by an adjuster 9. The construction and operation of these components are conventional.

The amplitude sample sequence, thus treated, is now applied as the input signal to a binary coder 10. A convenient coder to employ for the purpose comprises a cathode beam tube having a mask (FIG. 2, FIG. 3) that is perforated in a pattern conforming to the desired code and anodes located beyond the mask which are impacted by the cathode beam when it passes through the apertures of the mask and not otherwise. The beam being deflected lengthwise of the mask in accordance with each incoming signal sample, each anode picks up a signal corresponding to one code digit. For signals of high information rates such as television signals the coder tube may advantageously be of the "flash" type as described, for example, by W. M. Goodall in his Patent 2,616,060, granted October 28, 1952, in which the beam is a broad flat beam of a width such as to embrace, simultaneously, all of the aperture columns on the mask, thus to give simultaneous outputs on all of the digit output conductors. For a 7-digit code, capable of representing 128 different signal amplitude levels, there are seven such output conductors.

To obtain the added gain that is furnished by emission of secondary electrons from appropriately treated surfaces, the anode construction may advantageously be as described in an application of J. A. McCarthy, Serial No. 648,802, filed March 27, 1957. To minimize the coding errors that may result from minor departures of the deflected cathode beam from its correct position on the coding mask, the latter may advantageously be perforated in accordance with the reflected binary code as taught, for example, by F. Gray in his Patent 2,632,058, granted March 17, 1953.

Whether the coder 10 be of the flash type or of the sequential type, and whatever be the configuration of its mask, the cathode beam is advantageously turned on only when it has been deflected to the proper location on the mask, being turned off during its movement along the mask, thus to prevent the generation of meaningless intermediate code pulse groups. To this end the timing wave derived from the timing source 6 is applied, through a delay equalizer 11, to a blanking amplifier 12 whose output modulates the intensity of the cathode beam from zero strength, during each deflection operation, to full strength after its completion.

The output pulses which occur simultaneously on all seven of the output conductors 13 of the coder 10 may now be squared, shaped and brought to uniform standard amplitudes by regenerators 14. Each such regenerator may comprise a conventional blocking oscillator 15, preferably preceded by an amplifier 16.

After passage through differential delay equalizers 17 that operate to stagger the several digits of each code word among the digit channels and are included for reasons that will be explained below and that may be disregarded for the present, each digit pulse train is now applied, in accordance with the invention, to one principal input point 21 of a disparity modulator 20. The second principal input point 22 of the disparity modulator is supplied with a train of pulses that recur at precisely one half the basic pulse repetition rate of the system. The basic pulse repetition rate R in the present illustration is 10 megacycles per second, as determined by the intensity modulation of the beam of the coder tube under control of the timing wave source 6. A 2 to 1 divider 24, which may be a conventional single trip multivibrator, proportioned to have a time constant longer than $1/R$ and shorter than $2/R$, derives from this timing wave source a train of pulses whose repetition rate is $R/2$; i.e., in the present illustration, 5 megacycles per second; and this train is applied simultaneously and in parallel to the second principal input points 22 of all the disparity modulators 20.

A disparity modulator is a logical element which delivers a pulse or mark when the signals applied at its two input points are unlike and delivers no pulse; i.e., a space, when the signals applied to its two principal input points are alike. Many circuits are known which operate in this fashion, several of them being shown, for example, in R. L. Carbrey Patent 2,755,459, granted July 17, 1956.

To ensure that the timing of the output pulse trains from these disparity modulators 20 shall be as uniform as possible, each of them is provided with an auxiliary input point 23 to which clock pulses are applied from the timing wave source 6. The output from each disparity modulator 20 is thus a pulse or mark only when two conditions are simultaneously satisfied: (a) the signals applied to its principal input points 21, 22 are unlike; and (b) a clock pulse is present at its auxiliary input point 23. Thus, from the standpoint of the clock pulse input, this unit operates as a conventional product modulator.

The output of the disparity modulator 20 thus consists, when it exists, of a brief spike of current, centered in its assigned time slot which is one tenth microsecond duration. Each such current spike is advantageously brought to an energy level suitable for transmission and stretched to occupy approximately one half of its assigned time slot. Both of these operations may conveniently be carried out by a conventional blocking oscillator 25 which, because of the precise timing of the disparity modulator, requires no timing wave input.

Figure 2:
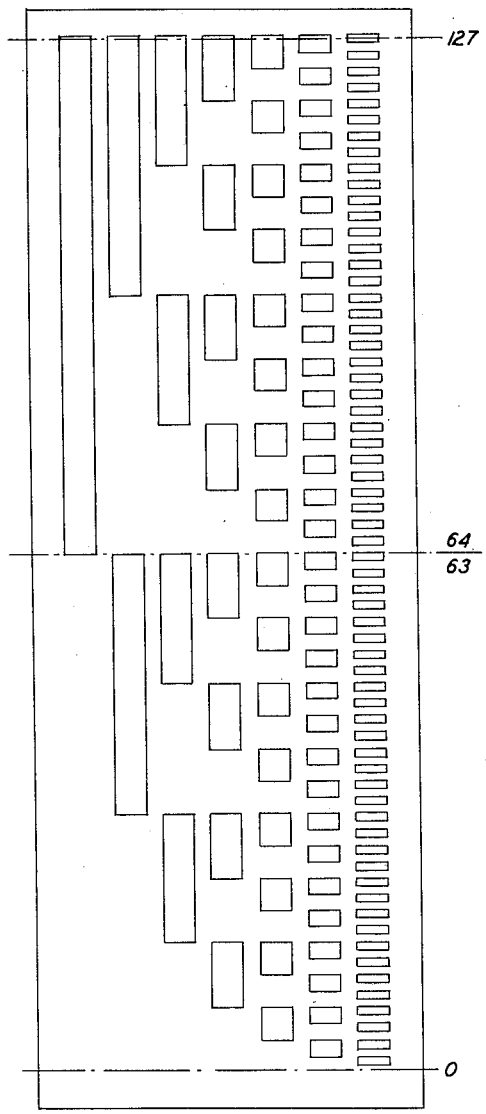
FIGS. 2 and 3 are diagrams showing the aperture configurations of beam tube coding masks in accordance with the natural binary and the reflected binary code, respectively.

The advantages offered by the present system will be apparent from the following considerations. When a message wave of any normal type is converted into a binary permutation code of fixed configuration, e.g., the natural binary code or the reflected binary code, successive values of any single code digit are far more likely to be alike than to be different. A moment's consideration of the coding process as carried out by the beam coder tube will show how this situation arises. Referring either to FIG. 2 or to FIG. 3, which show the coding masks of a beam tube coder for the natural binary code and for the reflected binary code, respectively, as the amplitude of the message wave varies, the coder tube beam waves up and down over the coding mask. When, for any particular signal amplitude sample, it falls on (or off) a particular coding aperture, then it is more likely than not to fall on (or off) the same aperture for the next sample. Evidently, the larger the aperture, the greater is this likelihood; and hence the greater the probability of a repetition of digit values from sample to sample. The likelihood is thus greatest in the case of the digit of highest denominational order, denoted the "first" digit, but exists to some extent even in the case of the digit of the lowest denominational order, here the seventh digit. This condition is departed from only in the rare situation in which the principal component of the message wave is of the Nyquist frequency, here 5 megacycles per second. In the case of a message wave of ordinary statistics the digit of lowest denominational order is likely to be repeated without change from 2 to 10 times while the digit of highest denominational order is likely to be repeated without change still oftener. The situation is especially severe in the case of a television wave derived from the scanning of an indoor scene a large part of which is a wall or other background of uniform brightness. In this case every one of the digits is repeated without change hundreds, or even thousands, of times.

Such unbroken trains of repeating digit values, marks or spaces, cause a wandering of the average signal level on the transmission line and make for uncertainty of operation of repeaters. Additionally, when the unbroken train is a train of spaces the timing information, on which repeaters and receiver rely for synchronous operation, fails.

The present invention escapes from both of these difficulties together: the longer each unbroken train of marks or spaces in the output of the fixed pattern coder, the longer the unvarying condition of mark-space alternation in the output of the disparity modulator 20.

Figure 4:
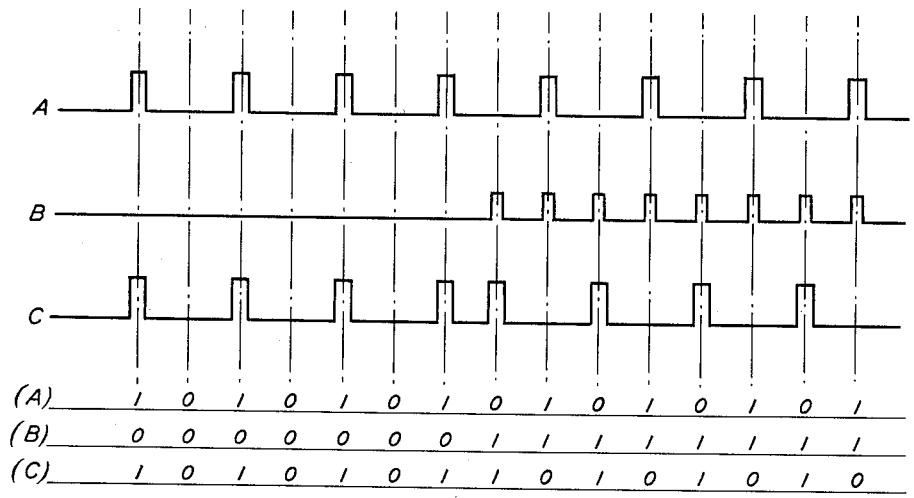
FIG. 4 is a group of wave diagrams of assistance in explaining the mode of operation of the invention.

Referring to FIG. 4, curve A shows an unvarying 5 megacycle pulse train which may be regarded as a carrier and constitutes the input to one of the two principal input points of the disparity modulator 20. Below it, in curve B, is a train of code elements comprising an unbroken sequence of seven spaces followed by an unbroken sequence of eight marks, constituting the input to the other principal input point of the disparity modulator. By virtue of the operations of the disparity modulator the first seven half cycles of the carrier train are left unchanged by the spaces of the code element train as shown in curve C while, in the next eight half cycles of the carrier, marks are interchanged with spaces by the marks of the code element train. In arithmetic terms, designating a space and a downward excursion of the carrier by "0" and a mark and an upward excursion of the carrier by "1," the carrier may be expressed as an unbroken alternating sequence of 1's and 0's, while the code pulse train may be expressed as a sequence of seven 0's followed by a sequence of eight 1's. Thus

TABLE IV

| | |
|---|---|
| Carrier | 1 0 1 0 1 0 1 0 1 0 1 0 1 0 1 |
| Fixed code pulse train | 0 0 0 0 0 0 0 1 1 1 1 1 1 1 1 |
| Binary sum (interchanged code pulse train) | 1 0 1 0 1 0 1 1 0 1 0 1 0 1 0 |

As appears from the arithmetic sum (without carry) that represents the disparity modulation process, the output pulse train can be represented by an alternating sequence of 1's and 0's with an abrupt change of phase at the point of time at which the fixed code train changes from an unbroken series of spaces to an unbroken series of marks. In wave terms the same result is shown in curve C of FIG. 4 where the carrier wave is repeated as long as the code train consists of spaces and is thereupon abruptly shifted in phase by a single full pulse period but otherwise repeated throughout the period in which the code train consists of an unbroken sequence of marks.

Evidently, the two portions of the wave C are of closely the same general character and, at all times, contain a generous amount of timing information. Evidently, too, the mean value of each of the two parts, taken separately, is zero, while the mean value of the two parts taken together differs only slightly from zero by virtue of the phase change. Hence the outgoing wave on each of the outgoing digit conductors is far more suitable for transmission, for regeneration at intervening repeater stations, and for controlling the timing of repeaters and receiver than would be the fixed pattern code element train without the interchange.

The several code-carrying waves, one for each of the digit conductors 26, are now transmitted over a suitable transmission medium and through as many repeater stations as may be desired to a receiver station, shown in FIG. 5, where they arrive on incoming conductors designated $D_1$, $D_2$ . . . $D_7$. Here each one is treated to remove any degradation that it may have acquired in the transmission link following the last repeater by a regenerator of any suitable sort, here indicated as comprising an amplifier 30 followed by a blocking oscillator 31. The blocking oscillator trigger circuit is enabled by an amplified 10 megacycle timing wave applied to it by way of amplifier 30. This 10 megacycle timing wave is derived from a timing recovery circuit 32. This unit, which may comprise a resonant circuit or crystal tuned to 10 megacycles per second and a delay equalizer, is in turn actuated by a subsidiary output conductor 33 of the blocking oscillator which may contain a sharply tuned resonant circuit or device, e.g., a piezoelectric crystal tuned to resonance at 10 megacycles per second. The principal output of the blocking oscillator 31 is thus an alternating sequence of marks and spaces, having abrupt phase changes from time to time, as shown in curve C of FIG. 4.

Any repeater required at an intermediate point of the transmission medium may have the same construction as the first stage of the receiver apparatus as described above.

Because the alternately interchanged code of the invention may present difficulties in decoding, the invention contemplates recovering from it the original fixed pattern code, in this case the reflected binary code, from which it was derived. Because of the simple and systematic principle of the alternate interchange code, such recovery requires simply a repetition of the disparity modulation process as carried out at the transmitter station. To this end there is provided, for each digit, a disparity modulator 40 having two principal input points and a subsidiary input point for timing pulses. The interchanged code pulse train derived from the blocking oscillator 31 is applied to its first principal input point and an auxiliary 5 megacycle demodulator pulse train is applied to its second principal input point. This 5 megacycle wave is derived, by a 2/1 frequency division, as by a single trip multivibrator 41, from a 10 megacycle pulse source 42 controlled by the timing wave output of the timing recovery unit 32. The disparity modulator 40 carries out, as between these two inputs, a disparity modulation operation identical with that carried out at the transmitter station. Thus, taking the broken alernating sequence of 1's and 0's derived as described above, i.e, the wave C of FIG. 4, as one of the inputs and an unbroken sequence of 1's and 0's representing the auxiliary 5 megacycle wave as the other input, the binary sum of the two trains (without carry) is as shown in the following tabulation:

TABLE V

| | |
|---|---|
| Interchanged code pulse train | 1 0 1 0 1 0 1 1 0 1 0 1 0 1 0 |
| Carrier | 1 0 1 0 1 0 1 0 1 0 1 0 1 0 1 |
| Binary sum (fixed code pulse train) | 0 0 0 0 0 0 0 1 1 1 1 1 1 1 1 |

The binary sum (without carry) thus produced is evidently a representation of seven spaces followed by eight marks; i.e., the code pulse train originally taken as an illustrative input to the first disparity modulator 20. The pulses delivered by the several disparity modulators 40 are advantageously regenerated by blocking oscillators 43–1, 43–2 . . . 43–7, which may be identical with the blocking oscillators 31.

While means are known for the direct decoding of reflected binary code pulse groups (see, for example, R. L. Carbrey Patent 2,538,615, granted January 16, 1951), it is preferred, because of the simplicity of decoding apparatus for natural binary code and of apparatus for translating from reflected to natural, to carry out the translating and decoding operations in sequence instead of the first one by itself. To this end, the next stage in the receiver apparatus is a code translator of the type described in R. L. Carbrey Patent 2,571,680, granted October 16, 1951, which utilizes a group of disparity modulators 44 and blocking oscillators 45. Because the operations of this apparatus include comparison of two code digits of different denominational orders the operations for the several digits must take place in sequence. It is for this purpose that the differential delays were introduced, at the transmitter station, in the several digit channels. As a result, the interchanged code counterpart of the first and second digits for each code word becomes available at the translator earlier, by $\frac{1}{10}$ microsecond, then that for the third digit. So, too, that of the third digit becomes available earlier by $\frac{1}{10}$ microsecond than does that for the fourth digit, and so on. The code translation operations for the successive digits of a single code word can thus take place in sequence without introducing confusion by comparison of a digit of one code word with the next digit of a different code word. This staggering, introduced by the differential delays 17 at the transmitter station, having now served its purpose, is advantageously removed by the introduction of complementary differential delays 47 indicated in the time equalizing stage of the receiver apparatus. The several digit pulse trains, having been converted to natural binary code, are thus brought into time coincidence for decoding.

Each such digit pulse train is now sampled, under control of the pulser 42, and each such sample is preferably held until the arrival of the next sample, by a unit 48 of the pulse stretcher stage. The outputs of these several units are now applied, by way of standard current switches 49, to the appropriate taps of an array of resistors whose magnitudes are proportioned to the successive powers of two. This array of resistors acts to add together, as voltages, the contributions of the several digits of the binary code to the original signal sample amplitude as described, for example, in R. L. Carbrey Patent 2,610,295, granted September 9, 1952.

The train of amplitude samples thus recovered by the decoding operation is now smoothed, as by passage through a filter 50 whose high frequency cutoff is located at, or slightly below the Nyquist frequency, in this case 5 megacycles per second. The resulting smoothed message wave, after amplification by an amplifier 51 is now applied to a reproducer 52 designed for the reproduction of the original message wave, in this illustrative example a television signal.

*Simultaneous Reinterchange and Code Translation*

Figure 6:
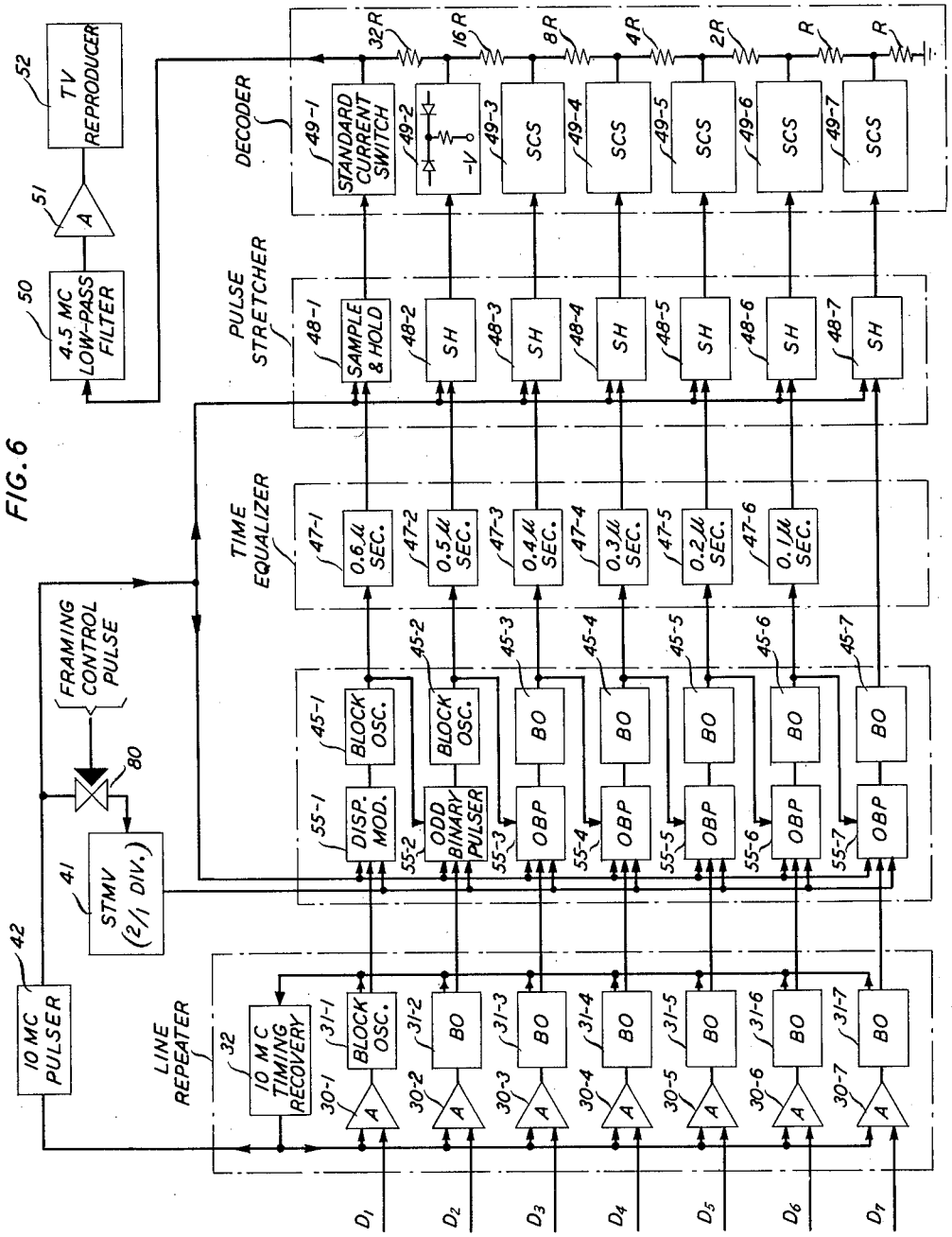
FIG. 6 is a block schematic diagram showing an alternative to FIG. 5 in which, for each code digit path, two disparity modulators have been coalesced into a single odd binary pulser.

The reader will have observed that the operations of the two disparity modulators 40, 44 of FIG. 5, serving to carry out the alternate reinterchange and the code translation, respectively, are identical. Hence these operations can, in principle, be carried out simultaneously and together, each of the two 2-input units being coalesced into a single 3-input unit for the purpose. FIG. 6 shows receiver apparatus, otherwise the same as FIG. 5, in which this coalescence has been effected. With three independent inputs, however, the term "disparity" seems no longer appropriate. Accordingly, each of the units 55 of FIG. 6 is termed an "odd-binary pulser." That this term is an appropriate designation appears from the following tabulation, which specifies output conditions of the unit for every permutation of its three principal input conditions.

TABLE VI

| Input A | Input B | Input C | Output |
|---|---|---|---|
| 0 | 0 | 0 | 0 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 1 |

As in the case of the disparity modulators 40, 44 of FIG. 5, each odd binary pulser 55 of FIG. 6 is provided with an auxiliary input point for application of the 10 megacycle timing pulse train, with respect to which it operates as an ordinary product modulator. This single auxiliary input point replaces the corresponding auxiliary input points of both of the disparity modulators 40, 44 of FIG. 5.

Figure 7:
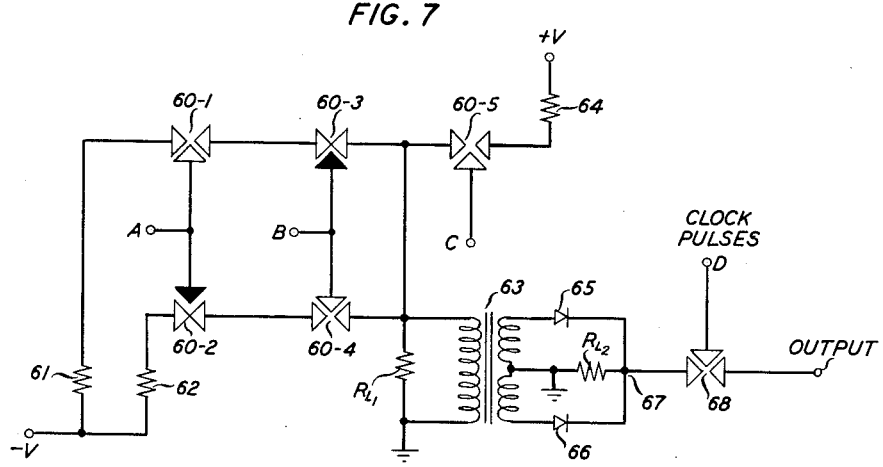
FIG. 7 is a schematic circuit diagram of an odd binary pulser.

The circuit details of the odd binary pulser may take many different forms, a simple one being shown in FIG. 7. It comprises a group of five switches 60–1 to 60–5 each of which is here shown conventionally as having two conduction terminals on a line and a third control terminal on a line perpendicular to the first line.

The convention is followed that when one of these switches is closed for a space and open for a mark it is shown in the "normally closed" fashion with the two arrowheads representing the conduction terminals in contact with one another and the third arrowhead, representing the control terminal, shown in heavy black, to open the conduction path when energized by a pulse, representing a mark. In the case of the switches that are closed in the presence of a mark and open in the presence of a space, the arrowheads representing the conduction terminals are shown separated from one another and the third arrowhead, representing the control terminal, is shown in outline, indicating that it establishes a connection between the first two arrowheads in the absence of energization by a pulse.

The control terminals of the first two switches 60–1 and 60–2 are connected together and supplied by one pulse train at the input point designated A. Similarly, the control terminals of the third and fourth switches 60–3 and 60–4 are connected together and supplied with another input pulse train at the terminal designated B. The input conduction terminals of the first two switches are connected by way of individual resistors 61, 62 to a source of negative voltage —V. The output terminals of the third and fourth switches are connected together and, through a resistor $R_{L1}$ to ground. The primary winding of a pulse transformer 63 is connected across the resistor.

The output terminals of the third and fourth switches are also connected to the output terminal of a fifth similar switch 60–5 whose input terminal is connected, by way of a resistor 64 to a source of positive voltage +V. A third input pulse train, designated C, is applied to the control terminal of the fifth switch.

The terminals of the secondary winding of the transformer 63 are connected, by way of rectifier elements 65, 66 to an output point 67 and, by way of a load resistor $R_{L2}$, to the midpoint of the secondary winding and to ground.

As indicated in the figure, the couplings between the control terminals of the first and second switches are such that if either one of these two switches is open, the other is closed. The control terminals of the third and fourth switches are similarly coupled together and in the same fashion.

As further indicated on the drawing, the switches are polarized in accordance with the following tabulation.

TABLE VII

| | | Condition | | Condition |
|---|---|---|---|---|
| Switch No. 1 | Input A 1 | Closed | Input A 0 | Open. |
| Switch No. 2 | Input A 0 | Closed | Input A 1 | Open. |
| Switch No. 3 | Input B 0 | Closed | Input B 1 | Open. |
| Switch No. 4 | Input B 1 | Closed | Input B 0 | Open. |
| Switch No. 5 | Input C 1 | Closed | Input C 0 | Open. |

The operation of the odd binary pulser of FIG. 7 will be understood from the following consideration of the several conditions of Table VI.

Suppose, for example that the values of A and of B are both 0. Switches 60–1 and 60–4 are then open while switches 60–2 and 60–3 are closed. Hence, both the upper and lower paths are open and nothing appears from the first four switches at the load resistor $R_{L1}$. If, to the contrary, values of the A and B inputs are both 1, switches 60–1 and 60–4 are closed while switches 60–2 and 60–3 are open and the same result holds: no signal applied to the load resistor $R_{L2}$.

If, at the same time input C is 0, nothing further transpires. If, to the contrary, input C is 1, a positive pulse from the source +V is applied to the load resistor $R_{L1}$ and this is transferred as a mark, by way of the transformer 63 and the rectifier 65 to the output point 67.

Thus the operations indicated in Table VI at lines 1, 2, 7 and 8 have been correctly duplicated.

Suppose, next, that input A is 1 while input B is 0. Switches 60–2 and 60–4 are now open and the lower branch is disabled. Switches 60–1 and 60–3, however, are closed simultaneously, and a pulse of negative voltage from the source —V is applied through the upper path to the load resistor $R_{L1}$. If, at the same time, the input C is 0 this pulse is not balanced by any other pulse, and the negative pulse is transferred, by way of the rectifier 66, to the output point as a mark. If, to the contrary, the C input at this time has the value 1, a positive voltage pulse is applied from the source +V to the load resistor $R_{L1}$ and serves to balance the negative pulse passed through the upper branch and so to prevent its transfer to the output point 67. These two conditions are evidently those of the fifth and sixth lines of Table VI. Similarly, if the input A is 0 while the input B is 1, the path through the upper branch remains blocked while the path through the lower branch extends from the source —V through the resistor 62 to the load resistor $R_{L1}$. A negative pulse is thus transferred through the rectifier 66 as a mark to the output point 67, provided the input C is 0. If, however, the input C is 1 a positive pulse from the source +V balances it so that the signal transferred to the output point 67 is a space.

Clock pulses, with respect to which the apparatus of FIG. 7 acts as an ordinary product modulator, may be applied to an auxiliary control terminal D, thus briefly to close a switch 68 on the occurrence of each one.

Framing—Generally

It is a consequence of the properties of the alternate interchange code that a slip of the carrier train by a single pulse position on the time scale with respect to the code pulse train produces, after the reinterchange operation, a complete reversal of the reinterchanged code, as compared with the original fixed pattern code before interchange. Thus, referring again to the situation illustrated in Table V, if the carrier were slipped by a single notch, either to the right or to the left, the two trains and their binary sum, constructed by the disparity modulator 40, would be as shown in Table VIII.

TABLE VIII

| | |
|---|---|
| Interchanged code pulse train | 1 0 1 0 1 0 1 1 0 1 0 1 0 1 0 |
| Carrier, slipped by one pulse position | 0 1 0 1 0 1 0 1 0 1 0 1 0 1 0 |
| Binary sum | 1 1 1 1 1 1 1 0 0 0 0 0 0 0 0 |

Evidently, the result is seven marks followed by eight spaces, the exact reverse of the original uninterchanged train of seven spaces followed by eight marks. Identically the same result follows for a slip of three or any odd number of pulse positions between the carrier and the interchanged code pulse train. In contrast, a slip of two or any even number of pulse positions is unnoticeable.

This property of the interchanged code can be turned to account in the framing of the received message as described below. It is to be noted, however, that in at least one case of substantial practical importance the same property can be turned to account to eliminate the need for framing. This particular case is that of an audible message wave, e.g., speech or music, originally encoded in the natural binary code. Referring again to FIG. 2, it will be seen that the natural binary coding mask has full negative symmetry about its central horizontal axis, i.e., about the line that separates the 63rd quantum level from the 64th. Thus, if such a coder be employed and if the zero signal deflection of the cathode beam be biased to this center line, consider a message wave sample of amplitude such as to deflect the cathode beam still further up the mask by 11 quantum levels, i.e., to the 74th level. This will evidently be coded 1 0 0 1 0 1 0. Another message wave sample of equal magnitude and opposite polarity deflects the beam downward from the center line to the 53rd quantum level and this will be coded 0 1 1 0 1 0 1. Evidently the second code pulse group is the inverse of the first. Hence, in this particular case, a complete inversion of the reinterchanged code as opposed to the uninterchanged code gives rise to the reproduction, after decoding, of each message wave sample with the correct magnitude and with inversion of its polarity; that is to say, every message wave component is inverted in phase. Inasmuch as the ear is a nonpolar receptor organ and is insensitive to phase, the result of the inversion is undetectable.

Figure 3:
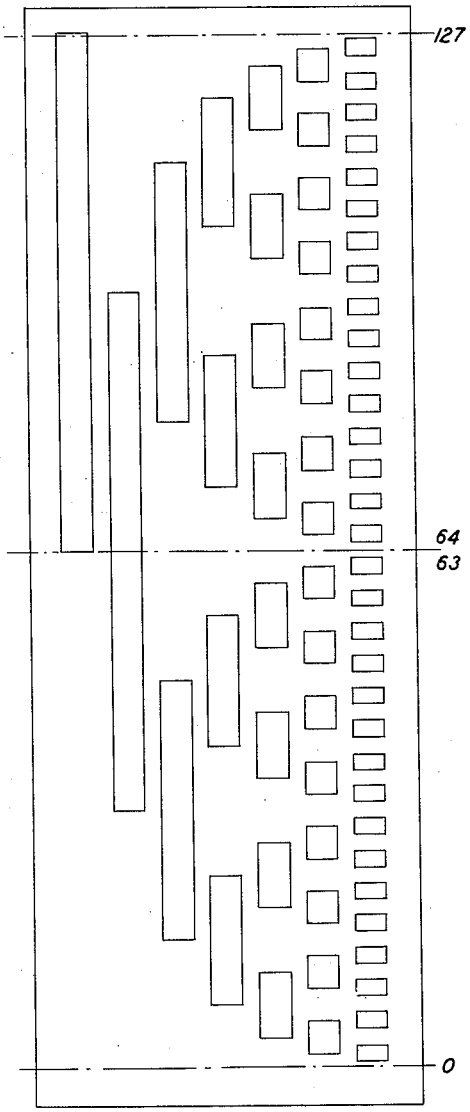

Because the mask of FIG. 3 for the reflected binary code does not have the same negative symmetry about its center line, this result does not hold in the case of the reflected binary code, even for an audible message wave. Moreover the eye is, unlike the ear, a polar receptor so that code inversion resulting from a carrier slip results in incorrect reproduction of a television message wave. In the particular case of the natural binary code the image thus incorrectly reproduced bears precisely the same relation to the original scene as a photograph negative bears to its positive. In addition, inversion of the polarities of the synchronizing pulses which normally constitute integral parts of the television wave would result in a failure of horizontal and vertical synchronization.

Hence, it is in general advantageous to turn the properties of the alternate interchange code to account in ensuring that the carrier train employed for reinterchange shall be fully synchronized with the carrier train employed for the initial interchange operation.

Once the system is in correct operation, maintenance of such synchronization presents no problems. When it is first placed in operation, however, the phase of the 5 megacycle carrier developed at the receiver station by the divider 41 from the timing wave source may start in either of two opposite phases at random, even though the timing wave source 42 may be perfectly synchronized with the basic pulse repetition rate, 10 megacycles per second, of the incoming code pulse train. One of these phase conditions is correct and results in true reproduction of the message wave. The other is incorrect, produces complete inversion as illustrated in Table VIII and results in incorrect reproduction of the message wave. To change from such incorrect reproduction to correct reproduction, once the situation has been recognized, it is necessary only to block a single pulse from the 10 megacycle timing wave source 42 on its way to the divider 41. This immediately causes the 5 megacycle carrier to be slipped by one notch so that the operation, in the example given, is immediately changed from that of Table VIII to that of Table V.

The simplest way in which this can be accomplished is to provide the recipient, subscriber or viewer, with a push-button connected to control the blocking of a single one of the timing wave pulses from the 2/1 divider 41, whose output then slips by one notch. The recipient thus controls the framing of his received message manually. For commercial purposes, however, it is of course desirable that the message framing, if incorrect, shall be corrected automatically, and preferably before the recipient becomes aware that it has been temporarily incorrect. This automatic framing may be secured in various ways, all of which have, as a common features, that at least some one recurrent property of the message wave shall be known beforehand and can be positively associated with some preselected permutation pulse code. Several of these will now be described.

Framing—First Approach

Figure 8:
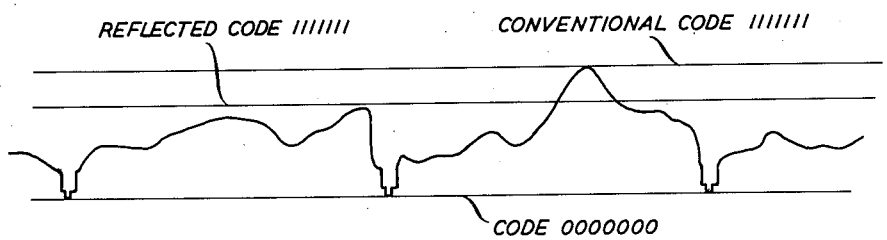
FIG. 8 is a reproduction of a portion of a representative television wave.

One approach to the problem of automatic framing is based on the statistics of television signal waves. According to present day standards, the periods occupied by the scanning beams of the television camera and reproducer tubes in returning from the end of each scanning line to the starting point for the following scan, known as "flyback" times, are occupied by the synchronizing signals which extend, on the amplitude scale, in a direction opposite to that of the "bright" vision signals. They extend, by an ample margin of safety, beyond the amplitude representing a jet black picture element; to employ the curious phraseology of the television engineer, they are "blacker-than-black." As shown in the typical television wave of FIG. 8, each such excursion terminates in a "pedestal"; and the lower margins of these pedestals, always of the same signal amplitude, represent the most extreme downward excursions of the wave.

Furthermore, in accordance with present standards each of these pedestals endures for about 5.1 microseconds. With the 10 megacycle pulse repetition rate and with the parallel coder outputs of the present example this period represents 51 code words in sequence.

These pedestals, therefore, constitute features of the television message wave that are known beforehand and to which code representations can be assigned unambiguously. Thus, for example, the sensitivity of the deflection amplifier 8 and the deflection bias control 9 (FIG. 1) can be so adjusted that, for each such pedestal, the coder tube beam is deflected to the foot of the coding mask, with the result that each of the 51 successive elements of the pedestal is coded, either in the conventional code or in the reflected code, as 0 0 0 0 0 0 0. In contrast, a picture element of maximum brightness deflects the beam to the upper margin of the mask and is thus coded, in the natural code as 1 1 1 1 1 1 1 and, in the reflected code, as 1 0 0 0 0 0 0. In the case of the reflected code, the code word 1 1 1 1 1 1 1 represents a beam deflection to the 85th quantum level that is represented, in turn, in the natural binary code, by the word 1 0 1 0 1 0 1.

These adjustments being made, it is apparent that when, at the receiver, the phasing of the locally generated carrier is correct, code words of the form 0 0 0 0 0 0 0 will recur regularly, and in groups of approximately 51 such words in sequence for each of the pedestals of the television wave. To the contrary, a similar recurrence of the inverse code words 1 1 1 1 1 1 1 constitutes a strong indication that the framing is incorrect. When, in addition, successive groups of 51 code words of the form 1 1 1 1 1 1 1 occur without any intervening code words of the form 0 0 0 0 0 0 0, it becomes a practical certainty that the receiver is incorrectly framed. Once this certainty is arrived at the carrier may be caused to slip by one notch, whereupon the framing is inverted and thus rendered correct.

Figure 9:
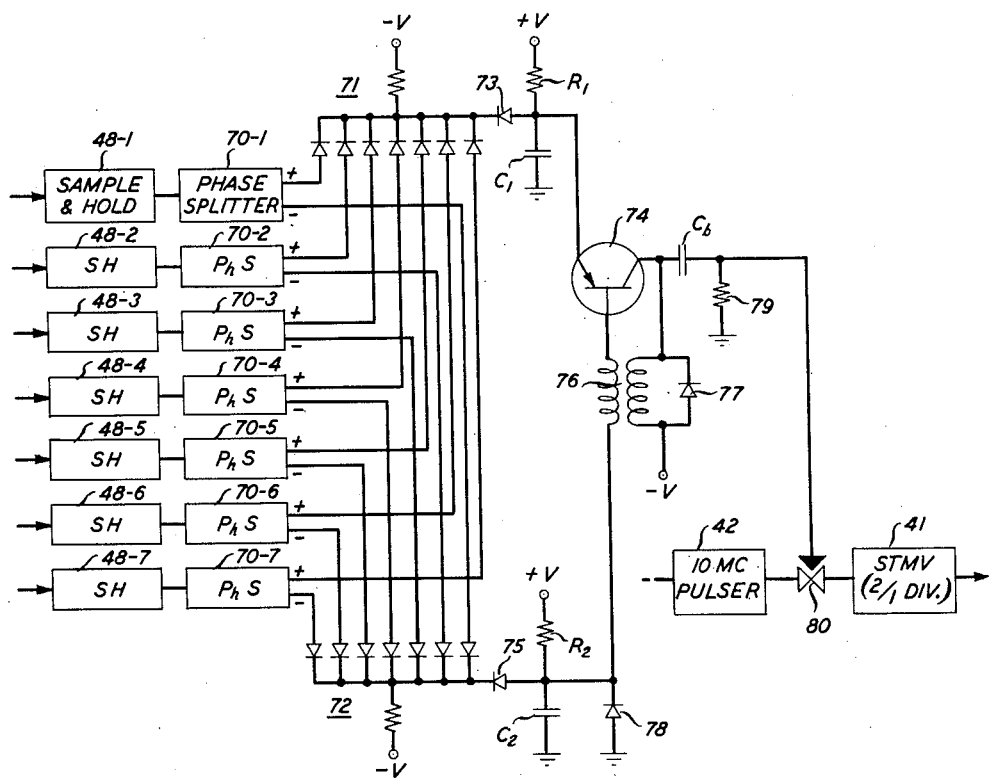
FIGS. 9, 10 and 11 are schematic circuit diagrams of apparatus for the recognition and correction of any framing error that may occur in the receiver of FIG. 5 or of FIG. 6, based on three distinct approaches.

FIG. 9 shows apparatus for recognizing the foregoing conditions and carrying out the operations called for. At the left-hand margin of the figure the several holding samplers 48 of FIG. 5 are shown repeated, and each one supplies a phase splitter 70 having two output terminals designated "+" and "−" respectively. The several "+" output terminals extend to the several cathodes of a group 71 of 7 diodes whose anodes are connected in common through a resistor to a point of negative potential. This arrangement 71 of diodes, resistor and potential source is an AND gate of well-known variety. Similarly the several "−" terminals of the phase splitters 70 are connected to the several diode cathodes 72 of another AND gate. The common terminal of the first AND gate is connected, by way of a blocking diode 73 to the emitter electrode of a transistor 74 while the common terminal of the second AND gate is similarly connected by way of another blocking diode 75 to the base electrode of the transistor 74. Operating potential is supplied to the collector electrode from a source of negative potential −V through the primary winding of a feedback transformer 76, shunted by a diode 77. The emitter electrode is supplied with operating bias potential from a positive source +V through a resistor $R_1$ and is connected to ground by way of a holding condenser $C_1$. Similarly the base electrode is supplied with operating bias potential from a positive source +V through a resistor $R_2$ and is connected to ground through another holding condenser $C_2$, shunted by diode 78 which prevents capacitor $C_2$ from being charged below ground potential. With this limitation sequences of 1 1 1 1 1 1 1 code groups cannot trigger the blocking oscillator unless the number of 0 0 0 0 0 0 0 code groups is insufficient also. The resistors $R_1$, $R_2$ are proportioned to bias the transistor 74 beyond its cutoff condition when the normal charges are stored in capacitors $C_1$ and $C_2$ as hereinafter described. Tight inductive coupling is provided by the transformer 76 between the collector electrode and the base electrode, thus to provide a blocking oscillator circuit. The collector electrode is also connected by way of a blocking condenser $C_b$ to a load resistor 79 and to the control terminal of a switch 80, normally closed, whose conduction path extends from the 10 megacycle pulser 42 to the single trip multivibrator 41.

On each occurrence of the code word 0 0 0 0 0 0 0 at the outputs of the several holding samplers 48 it reappears as a group of negative pulses on the "+" terminals of the several phase splitters 70 and hence on the anodes of the upper AND gate 71. It thus acts to drive all the diodes of the AND gate 71 into their cutoff conditions and to allow their common conductor to fall toward the potential of the source −V, thus applying a negative potential to the emitter electrode of the transistor 74 holding it in its cutoff state. Repetitions of the code word 0 0 0 0 0 0 0 in rapid sequence operate in cumulative fashion, by charging the holding condenser $C_1$, to drive the transistor 74 still further beyond the cutoff point. Under this condition no transient that may originate in the lower AND gate 72 can trip the transistor 74.

On each occurrence of the code word 1 1 1 1 1 1 1 at the outputs of the several holding samplers 48 the inverse code word, 0 0 0 0 0 0 0, reappears at the "−" output terminals of the several phase splitters 70 as a group of negative pulses. This condition acts through the lower AND gate 72, to depress the potential of the base electrode of the transistor 74, and large numbers of such code words provide an accumulation of negative charge on the lower holding condenser $C_2$ such as to reduce the cutoff margin of the transistor 74.

When the number of repetitions of the code word 1 1 1 1 1 1 1, recognized by the lower AND gate 72, exceeds the number of code words 0 0 0 0 0 0 0 recognized by the upper AND gate 71 by a sufficient margin, the negative charge accumulated on the lower holding condenser $C_2$ becomes large enough, and the negative charge accumulated on the upper holding condenser $C_1$ remains small enough, to place the transistor 74 in full readiness for operation by the next negative pulse applied to its base electrode. Upon the next occurrence, therefore, of the code word 1 1 1 1 1 1 1 the transistor 74 commences to conduct. By virtue of its blocking oscillator action the increase of its conduction is cumulative and a high energy pulse is delivered by way of the blocking condenser 78 to the control terminal of the switch 80. This acts momentarily to block the passage of a single one of the 10 megacycle timing pulses from the single trip multivibrator 41, and the latter pauses for a single pulse interval before being tripped. This causes its output 5 megacycle pulse train to slip one notch and thus to reverse the framing condition. The emitter current of transistor 74 which flows during the blocking oscillator pulse causes capacitor $C_1$ to charge to a negative potential. This negative potential is sufficient to hold transistor 74 in the cutoff condition after the blocking oscillator pulse has terminated, thus preventing a subsequent trigger operation for a short period, even though repeated code words 1 1 1 1 1 1 1 appear by chance.

With corrected framing, the code word 0 0 0 0 0 0 0 should appear at intervals to maintain a negative potential on capacitor $C_1$, thus keeping transistor 74 cut off. If a sequence of code words 0 0 0 0 0 0 0 does not appear within a predetermined time, the current through resistor $R_1$ will discharge capacitor $C_1$ to that level which will permit the blocking oscillator to be triggered if a sequence of code words 1 1 1 1 1 1 1 appears.

*Framing—Second Approach*

The second approach to the automatic framing problem depends on the statistics of the reflected binary code. Reference to FIG. 3 shows that for any signal sample that is greater than one quarter of the peak-to-peak signal amplitude range and less than three quarters of the same range, digit No. 2 of the reflected code is present as a mark. For most signals encountered in practice, therefore, and especially for all but the loudest audible message waves, digit No. 2 appears as a mark far more often than it appears as a space. Therefore a count of the mark pulses on the digit No. 2 conductor when the framing is correct can be relied on to reveal a duty factor of far more than 50 percent, e.g., marks appear 80 percent of the time and spaces only 20 percent of the time. When, to the contrary, framing is incorrect the reverse is true, marks appearing 20 percent of the time and spaces 80 percent of the time. Thus a comparison of the proportions of the digit No. 2 marks to the digit No. 2 spaces can serve as a basis for the determination of correctness or incorrectness of framing and thus for generation of an inhibiting pulse to cause the locally generated carrier to slip one notch.

This approach leads to a simplification of FIG. 9 in that all the phase splitters 70 and all the diodes of both AND gates except those connected to the output of the No. 2 digit holding sampler 48–2 can be omitted. With this change the circuit of FIG. 9 operates to recognize an excess of No. 2 digit spaces over No. 2 digit marks and, when this excess has prevailed for a suitable assurance time, dependant on the time constants of the holding condensers $C_1$, $C_2$ and their associated resistors $R_1$, $R_2$, to deliver a pulse to the control terminal of the switch 80, thus to block the passage of a single one of the 10 megacycle pulses from the single trip multivibrator 41 and so to cause the locally generated carrier to slip by a single notch.

With the circuit of FIG. 9 the magnitudes of the successive charge increments placed on the holding condensers $C_1$, $C_2$ by the output pulses from the upper and lower AND gates 71, 72 are dependent in part on the charges already stored on these condensers, and the larger the stored charge, the smaller the increment. If, therefore, to provide a high degree of certainty in the recognition of the framing condition the tripping threshold of the blocking oscillator is so chosen with respect to the capacitances of the condensers, the magnitudes of the charging sources and charging resistors that the tripping threshold is not reached until after a considerable number, e.g., 50 successive charge increments recurring in rapid succession or a still greater number recurring at greater intervals, the certainty with which the blocking oscillator is tripped upon the occurrence of the next charge increment becomes low. Thus, certainty of recognition of improper framing is purchased at the price of uncertainty of operation of the frame-restoring circuit.

Figure 10:
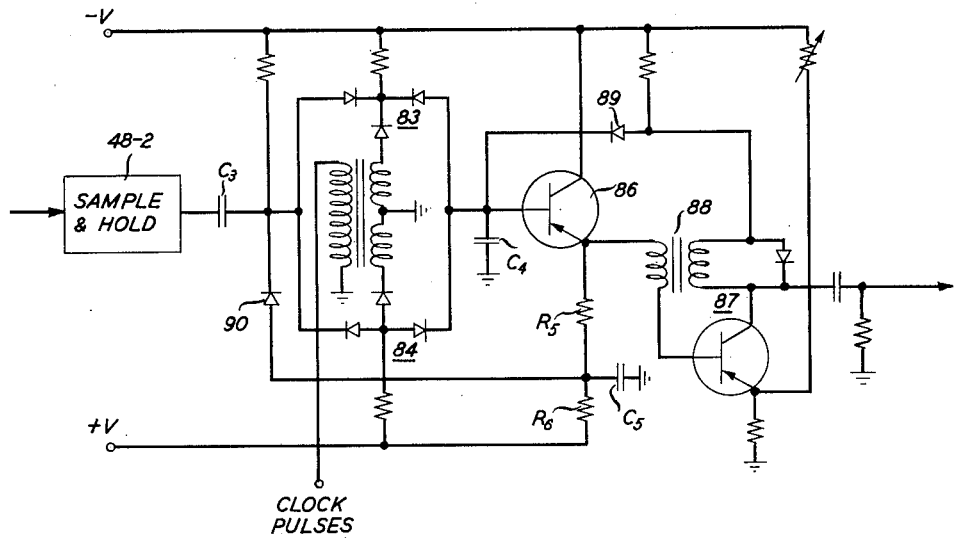

These difficulties are readily overcome by resort to the so-called "boot strap" technique; i.e., feedback of a steady voltage which acts to modify the reference level from which the successive charge increments are measured. FIG. 10 shows a circuit of this character arranged to respond to the incorrect ratio of spaces to marks in the second digit pulse position of the reflected binary code. As in the case of FIG. 9, a bypath from the second digit holding sampler 48–2 of FIG. 5 constitutes the input to the circuit. The second digit pulse train is applied, this time by way of a blocking condenser $C_3$, to the common input point of two triple diode gates 83, 84 each of which may be of the type described in W. D. Lewis Patent 2,535,303, granted December 26, 1950. The diodes of these gates are oppositely poled and they are supplied with positive and negative bias potentials from sources $+V$ and $-V$ respectively. As a convenience, clock pulses derived from the 10 megacycle pulser may be applied through a transformer 85 to both these gates together, and in phase coincidence. With this arrangement, each incoming mark pulse places an increment of charge of one sign on the holding condenser $C_4$ while each incoming space pulse places an increment of charge of opposite sign on the same condenser. The holding condenser $C_4$ is connected through a conventional common collector transistor amplifier 86 to the base electrode of a transistor blocking oscillator 87 whose electrodes are interconnected and intercoupled as in the case of the transistor 74 of FIG. 9. An additional feedback path extends from the primary winding of the coupling transformer 88 through diode 89 to holding capacitor $C_4$. The positive pulse produced by the blocking oscillator when it operates as hereinafter described charges holding capacitor $C_4$ to the potential corresponding to correct framing, thus providing a normal evaluation internal before the blocking oscillator can be operated again, even though digit No. 2 is present as a space. The amplifier transistor 86 is connected as an emitter-follower stage and the voltage developed across the resistor $R_6$ is smoothed out by filter capacitor $C_5$. The resulting potential across filter capacitor $C_5$ serves as a variable reference potential for "D.-C. restorer" diode 90. This diode 90 acts in the fashion of the well-known "D.-C. restorer" to prevent the incoming signal train from going below the reference potential. Thus all pulses are maintained at substantially their full magnitude above the reference potential. In contrast to other systems of this general type in which the reference potential is held fixed, in the circuit of FIG. 10, the reference potential across capacitor $C_5$ changes in proportion to the charge stored in capacitor $C_4$. As the potential across $C_4$ becomes more positive due to a predominance of mark pulses the reference potential across filter capacitor $C_5$ also becomes more positive thus permitting the input train to the two triple diode gates 83 and 84 to become more positive also. As a result the potential which can be developed across holding capacitor $C_4$ is not limited to the peak-to-peak range of the input wave train. It is instead limited to the sum of the peak-to-peak range of the input wave train and the peak-to-peak range of the reference potential across filter capacitor $C_5$. This increased range maintains the magnitudes of successive charge increments applied to the holding capacitor in substantial independence of the charge already stored on it.

If desired, a boot strap circuit such as that of FIG. 10 may be included for each of the seven digits, thus in effect introducing the boot strap principle into the code word gates of FIG. 9.

*Framing—Third Approach*

Still another approach to the framing problem is to arrange, e.g., by modification of the coding mask, that some single code word can occur only when framing is incorrect. For example, referring to FIG. 2, the code word 0 1 1 1 1 1 1 represents, in the natural binary code, the 63rd level from the foot of the mask, while the inverse code word, 1 0 0 0 0 0 0 represents the 64th level. FIG. 3 shows that these levels are represented, in the reflected binary code, as 0 1 0 0 0 0 0 and as 1 1 0 0 0 0 0, respectively. Either of these levels lies well within the range of deflection of the cathode beam of the coding tube along the mask for normal television signals, while, for voice signals, they represent the smallest amplitudes. Hence, in each case, each of these code words may be expected to be generated, from time to time, by a beam tube coder having a mask as shown in FIG. 2 or FIG. 3.

Suppose, however, that the entire group of seven apertures of the coding mask be omitted at one of these two levels, e.g., at the 64th level, and the mask shortened to avoid a blank space. With this modification of the mask, neither the natural code word 1 0 0 0 0 0 0 nor the reflected code word 1 1 0 0 0 0 0 can ever occur in the course of the normal coding process.

Hence, with this arrangement, the mere occurrence, at any time after the completion of the reinterchange process, of the code word 1 1 0 0 0 0 0 in the reflected binary code or of the code word 1 0 0 0 0 0 0 in the natural binary code, provides a clear indication that framing is incorrect and that one pulse of the 10 megacycle pulse train should be blocked from the 5 megacycle pulse generator, thus to cause the latter to slip one notch.

Figure 11:
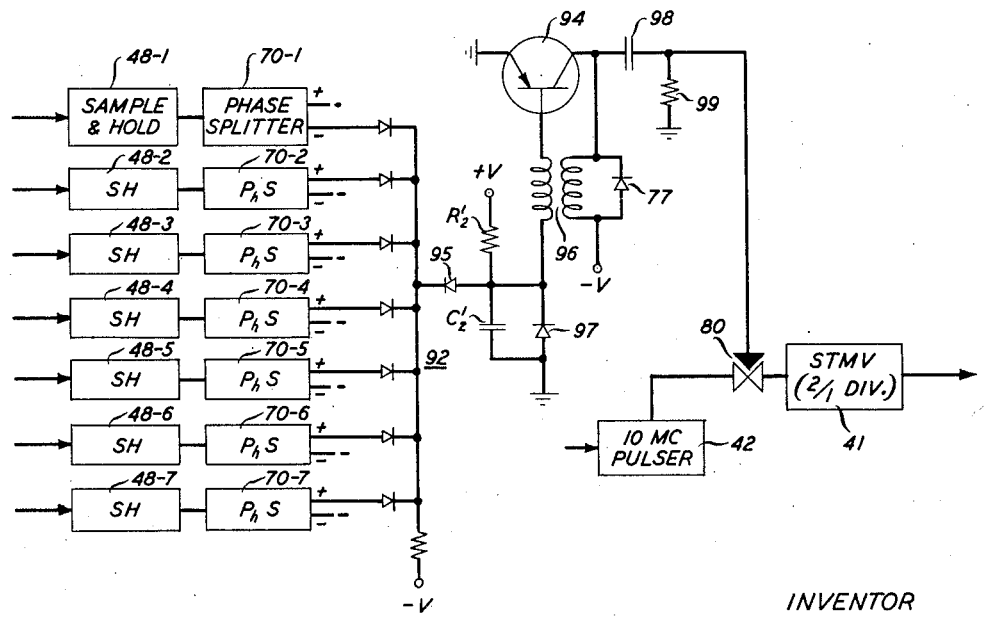

FIG. 11 shows a modification of FIG. 9, simplified to carry out these operations. As before, a convenient point of entry is provided by the holding samplers 48 of FIG. 5 or FIG. 6 where the code appears after reinterchange. All of the diodes of the single AND gate 92 but the first are connected to the "+" output points of the phase splitters 70, as with the upper AND gate 71 of FIG. 9. The first diode, in contrast, is connected to the "−" output point of the first digit phase splitter, as in the case of the lower AND gate 72 of FIG. 9. The AND gate 92 is thus proportioned to recognize the forbidden code word 1 0 0 0 0 0 0 and to deliver a pulse to the base of the blocking oscillator transistor 94 on its occurrence. Inasmuch as no comparisons with the inverse code word are to be made, the emitter electrode of the transistor 94 may be connected to ground. The circuit is otherwise the same as that of FIG. 9. Because any single conventional binary code word of the form 1 0 0 0 0 0 0 signals an error in framing, no substantial lapse of time is required to reach a decision with certainty. Hence the holding condenser $C_2'$ and its charging resistor $R_2'$ may be proportioned to provide a relatively short time constant and, if desired, the output of the AND gate 92 may be raised to a higher amplitude level as by an amplifier before application to the base electrode of the transistor 94, thus to trip it after the occurrence of a very small number of repetitions of the forbidden code word.

The alternate interchange principle, while of especial application to mark-space code pulse trains, can also be applied with advantage to codes of other forms. Such other applicatiins will suggest themselves to those skilled in the art.

What is claimed is:

1. Apparatus for translating a train of two-valued code elements recurring regularly at a rate R and representative, according to a fixed plan code, of a message wave into a different train of two-valued code elements that is more suitable for transmission which comprises means for generating an auxiliary wave of frequency $R/2$, a parity modulator having two input points and an output point, means for applying said code element train to one of said input points, means for applying said auxiliary wave to the other of said input points, and means for withdrawing said different two-valued code element train from said output point.

2. Apparatus for translating a train of code elements, each of which is a mark or a space, recurring at a regular rate and representative, according to a fixed plan code, of a message wave into a different train of two-valued code elements that is more suitable for transmission which comprises means for interchanging marks with spaces and spaces with marks in every alternate code element, and means for transmitting the code element train resulting from said interchange to a receiver station.

3. Apparatus for translating a train of two-valued code elements, each of which is a mark or a space, recurring at a regular rate and representative, according to a fixed plan code, of a message wave into a different train of two-valued code elements that is more suitable for transmission which comprises means operative on the occurrence of each odd-numbered code element for interchanging a mark with a space and a space with a mark while leaving unaltered the values of the even-numbered code elements, and means for transmitting the code element train resulting from said interchange to a receiver station.

4. In combination with a source of a message wave, apparatus for converting said message wave into a train of two-valued code element pulses arranged in accordance with a fixed plan code and recurring at a basic pulse repetition rate R and suitable for transmission over ordinary transmission media to a distant point which comprises means for generating an auxiliary unvarying pulse train of repetition rate $R/2$, means for comparing each element of said code pulse train with a simultaneous element of said auxiliary train, means for delivering an output mark pulse when the compared code element values are unlike and for delivering an output space pulse when they are alike, and means for transmitting said output pulse train to a receiver station.

5. In combination with a source of a message wave, a beam tube coder having a coding mask provided with apertures that are arranged in accordance with the reflected binary code, means including said coder for translating each of a regular sequence of amplitude samples of said message wave into a group of code elements arranged in accordance with said code and recurring at a regular rate R, means for generating an auxiliary code element pulse train of pulse repetition rate $R/2$, means for comparing the code elements of said first train with those of said auxiliary train, means for delivering an output mark pulse when the compared code element values are unlike and for delivering an output space pulse when they are alike, and means for transmitting said output pulse train to a receiver station.

6. Apparatus for translating an incoming train of two-valued code elements recurring regularly at a rate R and representative, according to an alternate interchange code, of a message wave, into a form more suitable for decoding which comprises means for generating an auxiliary pulse train of repetition rate $R/2$, a parity modulator having two input points and an output point, means for applying said incoming code element train to one of said input points, means for applying said auxiliary train to the other of said input points, and means for withdrawing from said output point a code element train that is representative of said message wave according to a fixed code.

7. In combination with apparatus as defined in claim 6, wherein said output pulse train is representative of a message wave in accordance with the reflected binary code, means for translating said output pulse train into a derived pulse train that is representative of the same message in accordance with the natural binary code.

8. In combination with apparatus as defined in claim 7, means for translating each group of pulses of said derived pulse train into an amplitude sample, and means for applying said amplitude samples in succession to a reproducer.

9. In combination with apparatus as defined in claim 6, means for recognizing the phase relation that obtains between said auxiliary pulse train and said incoming pulse train, and means responsive to recognition of an undesired phase relation between said pulse trains for reversing the phase of said auxiliary pulse train.

10. In combination with apparatus as defined in claim 6, means for recovering from said incoming pulse train a timing wave of frequency R, and means for halving the frequency of said recovered timing wave to provide said auxiliary wave of frequency $R/2$.

11. In apparatus as defined in claim 6, means for recovering from said incoming train a timing pulse train of frequency R, a single trip multivibrator having a time constant longer than $1/R$ and shorter than $2/R$, means for normally applying each pulse of said timing pulse train to said single trip multivibrator, whereby it delivers a train of output pulses of repetition rate $R/2$, means for recognizing an incorrect phase relation between said last-named pulse train and said incoming pulse train, and means responsive to recognition of said incorrect phase relation for inhibiting the application of a single pulse of said timing wave train to said single trip multivibrator.

12. In combination with apparatus as defined in claim 6, means for recognizing the occurrence of a forbidden code word, and means responsive to said recognition for reversing the phase of said auxiliary pulse train.

13. In combination with apparatus as defined in claim 6, first means for registering each occurrence of a preassigned code word, second means for also registering each occurrence of the inverse of said preassigned code word, differential means for generating a control signal in response to a substantial excess of registrations in said first means over registrations in said second means, and means responsive to said control signal for reversing the phase of said auxiliary pulse train.

14. In combination with apparatus as defined in claim 13, wherein accumulation of registrations in said first and second registering means acts to reduce the certainty of operation of said differential means, means including a boot strap feedback path for offsetting the influence of said accumulation on said certainty.

15. Apparatus for simultaneously carrying out the operations of (a) reinterchange of an interchanged reflected code train of code element groups, one element of each group represently the value of one digit of the reflected binary permutation code, and of (b) translation of said reinterchanged train of code element groups from the reflected binary permutation code to the natural binary permutation code which comprises a plurality of odd binary pulsers coupled, respectively, to the several digit paths of the code, each such binary pulser having three input points, means for applying the several digit code elements of each group of incoming interchanged reflected binary code elements, of element repetition rate $R$, to the first input points of said several pulsers, means for applying auxiliary carrier pulse trains of repetition rate $R/2$ to the second input points of said several pulsers, and means for applying to the third input points of each of said several pulsers the output pulse train of the odd binary pulser coupled to the digit path of next higher denominational order.

16. An odd binary pulser which comprises a first resistor, a first switch and a third switch connected in tandem between a source of a first potential and a first impedance element, a second resistor, a second switch and a fourth switch connected in tandem between said potential source and said impedance element, a third resistor and a fifth switch connected in tandem between a source of a second potential and said impedance element, a rectifier for signaling the absolute magnitude of a voltage developed across said impedance element, and a utilization device connected to said rectifier, each of said switches having a control terminal, means including a first input point for actuating the control terminals of said first and second switches simultaneously and in opposite phase in response to a signal applied to said first input point, means including a second input point for actuating the control terminals of said third and fourth switches simultaneously and in opposite phase in response to a signal applied to said second input point, means coordinating said two simultaneous actuations in a fashion to close the first switch and open the third switch on the application of like signals to said first and second input points, and means including a third input point for closing the fifth switch upon the application of a mark signal to its control terminal.

17. In a system for reconstitiuting, from an incoming train of code element groups and under control of auxiliary waves, a message wave of unknown content but of known character, consecutive code element groups normally constituting consecutive code words and hence being representaive, according to a preassigned code, of consecutive values of a preassigned parameter of said message wave, one of said parameter values having a known pattern of incidence, a source of a primary auxiliary wave of pulses recurring at the code element rate, a secondary auxiliary wave source comprising a divider having an input point and an output point and constructed to deliver, at its output point, a single pulse for each sequence of $n$ pulses applied to its input point, where $n$ is an integer equal to the total number of different possible phase relations obtaining between code words and code element groups, only one of said relations leading to correct reconstitution, a normally established path extending from said primary wave source to said input point, means for adavncing said reconstituting means from each incoming code element to the next under the joint control of said primary and secondary auxiliary sources, means for recovering said correct phase relation, when once lost, which comprises means for monitoring said incoming code element groups and for determining, from said monitoring operation, incidences of code element groups that represent said parameter value, means for comparing the pattern of said last-named incidences with the known incidence pattern of said parameter value as it occurs in said message wave, and means responsive to a wide disparity between said determined pattern and said known pattern for momentarily breaking said path to withhold a single pulse of said primary source from said divider, thereby to alter the phase relation presently obtaining between code words and code element groups.

18. In a system for reconstitiuting, from an incoming train of code element groups, a message wave of unknown content but of known character, consecutive code element groups normally constituting consecutive code words and hence being representative, according to a preassigned code, of consecutive values of a preassigned parameter of said message wave, one of said parameter values having a known pattern of incidence, said reconstituting means operating with one of a plurality of discrete, different phase relations between code words and code element groups, only one of which leads to correct reconstitution, means for recovering said correct phase relation, when once lost, which comprises means for monitoring said incoming code element groups and for determining, from said monitoring operation, incidences of code element groups that represent said parameter value, means for comparing the pattern of said last-named incidences with the known incidence pattern of said parameter value as it occurs in said message wave, and means responsive to a wide disparity between said determined pattern and said known pattern for altering the phase relation presently obtaining between code words and code element groups.

19. In apparatus for reconstituting a message from an incoming train of code words, each of which is a unique permutation of $n$ two-valued code elements, said code words constituting the class of all but one of the $2_n$ possible permutations of said code elements, the remaining possible permutation being excluded from the class of legitimate code words, said reconstituting means operating with one of a plurality of discrete, different phase relations between code words and code element groups, only one of which leads to correct reconstitution, means for recovering said correct phase relation, when lost, which comprises means for monitoring incoming groups of code elements, means for recognizing said excluded code word when present in said train and means, responsive to recognition of said excluded word, for altering the phase relation presently obtaining between code words and code element groups.

20. In apparatus for reconstituting a message wave characterized by frequent excursions of small magnitude and rare excursions of large magnitude from an incoming train of code words, each of which is a permutation of $n$ two-valued elements arranged in accordance with the reflected binary code, whereby the code elements of next highest denominational order are present in every code word representing a message excursion of small magnitude, said reconstituting means operating with one of a plurality of discrete, different phase relations between code words and code element groups, only one of which leads to correct reconstitution, means for recovering said correct phase relation, when once lost, which comprises means for monitoring the code element of next highest denominational order in successive incoming groups of code elements, and means responsive to low incidence of said monitored code element for altering the phase relation presently obtaining between code words and code element groups.

21. In apparatus for reconstituting a message wave characterized by frequent excursions of small magnitude and rare excursions of large magnitude from an incoming train of code words, each of which is a permutation of $n$ two-valued elements arranged in accordance with a particular binary code, said code being characterized by the presence, in every code word representing a signal excursion of less than half maximum amplitude, of a code element of a specified denominational order, said reconstituting means operating with one of a plurality of discrete, different phase relations between code words and code element groups, only one of which leads to correct reconstitution, means for recovering said correct phase relation, when once lost, which comprises means for monitoring the code element of said specified denominational order in successive incoming groups of code elements, and means responsive to low incidence of said monitored code element for altering the phase relation presently obtaining between code words and code element groups.

22. In apparatus for reconstituting a message wave characterized by recurrent excursions of preassigned magnitude and duration from an incoming train of code element groups, each of which is nominally a code word, one of said code words being assigned to represent the magnitude of said excursions, said assigned code word thus recurring consecutively throughout the duration of each such excursion, said reconstituting means operating with one of a plurality of discrete, different phase relations between code words and code element groups, only one of which leads to correct reconstitution, means for recovering said correct phase relation, when lost, which comprises means for monitoring incoming groups of code elements to evaluate the frequency of occurrence of at least a significant portion of said assigned code word, and means responsive to failure of said assigned code word to occur throughout said duration for altering the phase relation presently obtaining between code words and code element groups.

References Cited in the file of this patent
UNITED STATES PATENTS

| | | |
|---|---|---|
| 2,700,696 | Barker | Jan. 25, 1955 |
| 2,912,684 | Steele | Nov. 10, 1959 |